United States Patent [19]

Millet et al.

[11] Patent Number: 4,617,574

[45] Date of Patent: Oct. 14, 1986

[54] INK-JET PRINT HEAD ASSEMBLY

[75] Inventors: Jean-Claude Millet; Jean-Louis Reynaud, both of Bourg les Valence, France

[73] Assignee: Imaje S.A., Les Valence, France

[21] Appl. No.: 676,195

[22] PCT Filed: Feb. 28, 1984

[86] PCT No.: PCT/FR84/00041

§ 371 Date: Oct. 23, 1984

§ 102(e) Date: Oct. 23, 1984

[87] PCT Pub. No.: WO84/03474

PCT Pub. Date: Sep. 13, 1984

[30] Foreign Application Priority Data

Mar. 7, 1983 [FR] France ................................ 83 03975

[51] Int. Cl.[4] .............................................. G01D 15/18

[52] U.S. Cl. ........................................................ 346/75

[58] Field of Search ....................... 346/75, 140 A, 145

[56] References Cited

U.S. PATENT DOCUMENTS

| | | | |
|---|---|---|---|
| 1,941,001 | 1/1929 | Hansel | 178/96 |
| 2,842,421 | 7/1958 | Dreyfus | 346/140 A |
| 4,201,993 | 5/1980 | Ito et al. | 346/75 |
| 4,277,790 | 7/1981 | Heibein et al. | 346/75 |
| 4,338,610 | 7/1982 | Sellen et al. | 346/75 |
| 4,356,499 | 10/1982 | Kodama | 346/75 |

FOREIGN PATENT DOCUMENTS

| | | | |
|---|---|---|---|
| 0036296 | 9/1981 | European Pat. Off. | 400/126 |
| 2025064 | 6/1971 | Fed. Rep. of Germany | 400/126 |
| 2465528 | 3/1981 | France | 400/126 |

OTHER PUBLICATIONS

IBM Technical Disclosure Bulletin, vol. 15, No. 5, Oct. 1972, Armonk (US), J. H. Meier: "Mechanical X-Y Aiming . . . ".

IBM Technical Disclosure Bulletin, vol. 17, No. 9, Feb. 1975, Armonk (US), R. E. Pelkie et al.: "Cassette Ink--Jet Head . . . ".

*Primary Examiner*—E. A. Goldberg
*Assistant Examiner*—Gerald E. Preston
*Attorney, Agent, or Firm*—Roland Plottel

[57] ABSTRACT

A printing head for equipping any printer of the continuous ink-jet type comprises a modulator element in which a body and an orientable cylindrical plate are incorporated in a modulator base. The orientable plate carries an ink-drop ejecting nozzle and is capable of optimizing the perpendicularity of the ink jet. The modulator element and an electrode-holder are rigidly fixed respectively to a casing and to a section of its cover which is pivotally mounted with respect to the modulator base. Slits formed in charging electrodes and charging-control electrodes can be positioned with respect to the axis of ejection of the ink jet.

10 Claims, 4 Drawing Figures

INK-JET PRINT HEAD ASSEMBLY

This invention relates to an ink-jet printing head.

The ink-jet printing technique consists in producing a continuous stream of calibrated drops delivered by a modulating system, then in applying an electrostatic charge to these drops by means of charging electrodes, and finally in deflecting each drop by means of an electric field. In consequence, a dot matrix is thus obtained if the substrate on which it is desired to write and the writing device undergo a relative displacement.

In an ink-jet printer, the functions mentioned above, namely fragmentation of the ink jet into calibrated drops, electrostatic charging and deflection of the drops, are obtained by means of a device which will hereinafter be designated as a printing head.

The function of this printing head is of key importance for good operation of an ink-jet printer. It must be ensured in particular that the path of the ink drops ejected by the nozzle is perfectly defined with respect to the charging electrodes, with respect to the deflecting plates, and with respect to the substrate which is being printed. In addition, the printing head which satisfies these criteria must be of small overall size, must not require any adjustment during operation but must nevertheless permit simple and reliable adjustments prior to startup. Finally, the printing head must offer great ease of access for maintenance purposes.

The precise aim of the present invention is to provide a printing head having a structural design which meets all the essential requirements mentioned in the foregoing. More specifically, the invention relates to an inkjet printing head provided in particular with modulating means which are capable of severing the ink jet by "pinchoff", means for ejecting calibrated drops, means for applying an electrostatic charge to these drops and deflecting means. The distinctive feature of the printing head lies in the fact that the modulating and ejecting means are incorporated in a first modulator element and the charging and deflecting means are incorporated in a second element or so-called electrode-holder, the first and the second element being rigidly fixed respectively to a casing and to the cover of said casing.

Other features of the invention will be more apparent upon consideration of the following description and accompanying drawings, wherein.

Figure 1:
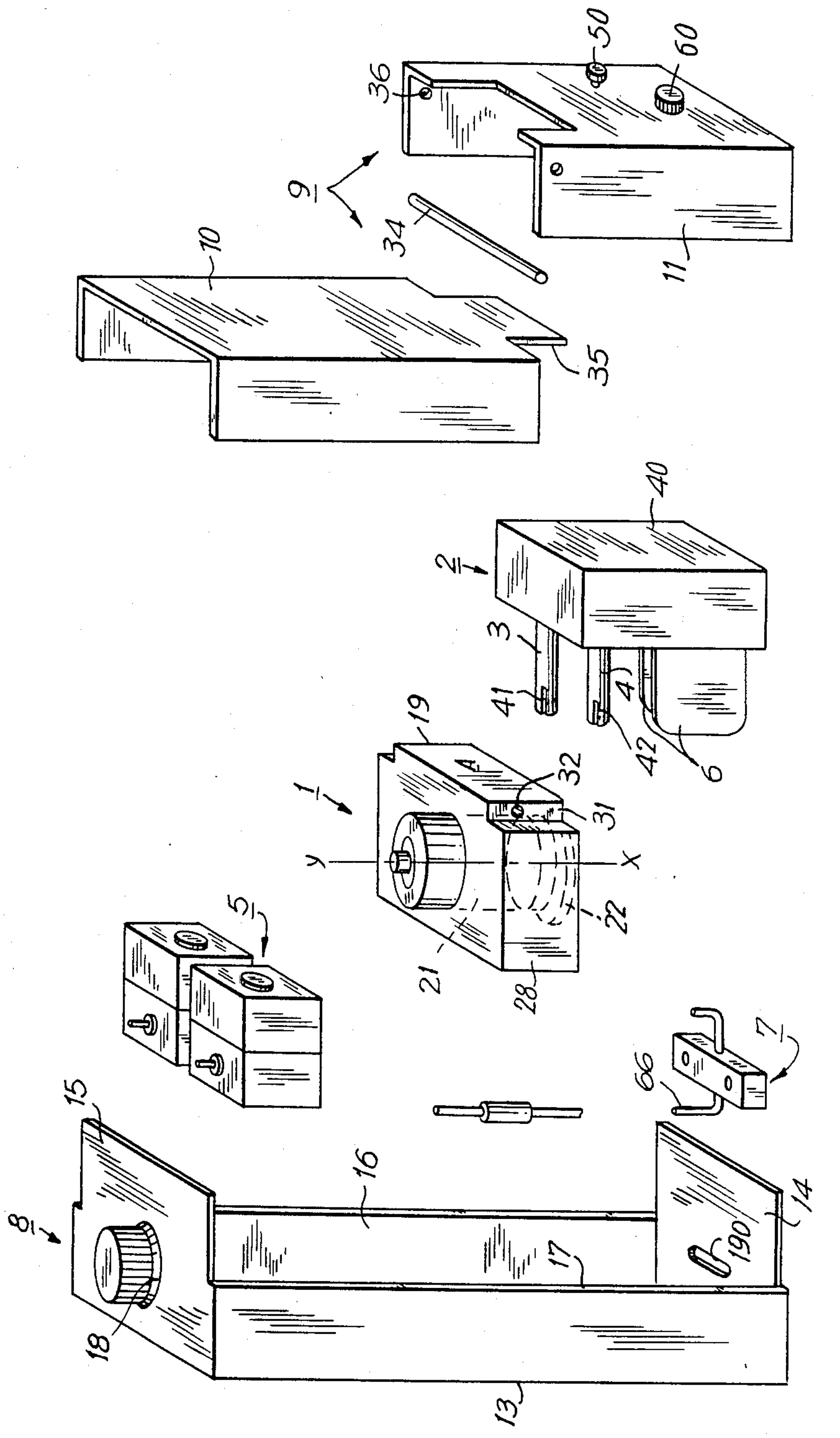
FIG. 1 is a schematic representation of the principal components of a printing head in accordance with the invention.

As shown in FIG. 1, a printing head in accordance with the invention is essentially constituted by a modulator element 1, an electrode-holder 2 which serves as a support for the charging electrodes 3 and 4, as well as the deflecting plates 6. A system of electrovalves 5 for regulating the fluid supply as well as a tube-holder 7 for supporting a dump tube 66, the function of which is to collect ink drops not used in the printing process, are also incorporated in the printing head.

These elements 1, 2, 5, 7 are introduced into a casing 8, the cover 9 of which is made up of two parts, namely a stationary upper section 10 and a movable lower section 11. In accordance with an important feature of the invention, the casing 8 and its cover 9 perform two functions : that of enclosing and maintaining in position the essential elements set forth in the foregoing. Said casing 8 in fact cooperates with the novel structure of these elements in order to obtain on the one hand optimum localization of jet interruption known as "pinch-off" and, on the other hand, perfect centering of the jet.

Figure 4:
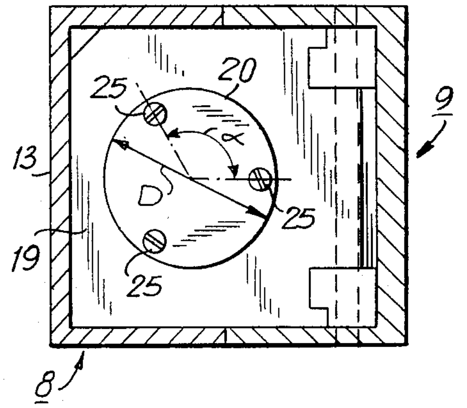
FIGS. 2, 3 and 4 are more detailed representations of certain elements of FIG. 1, the same elements being designated by the same references in all the figures for the sake of enhanced clarity.
Figure 2:
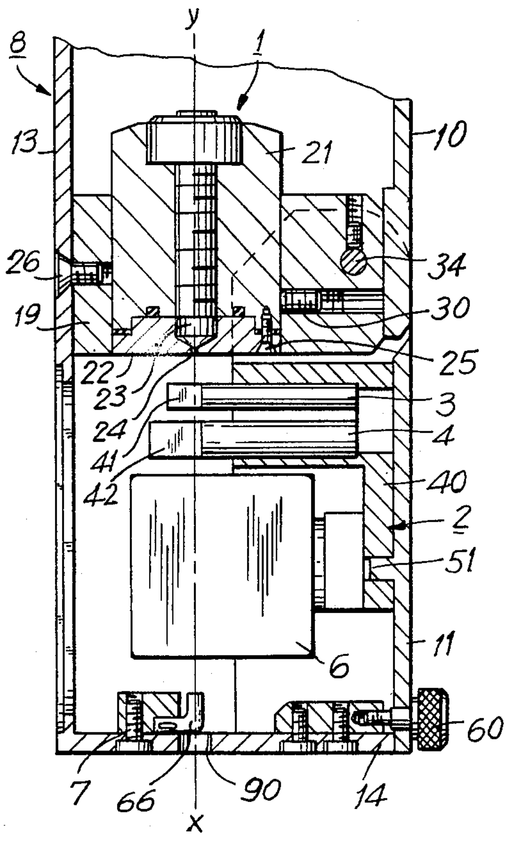
Figure 3:
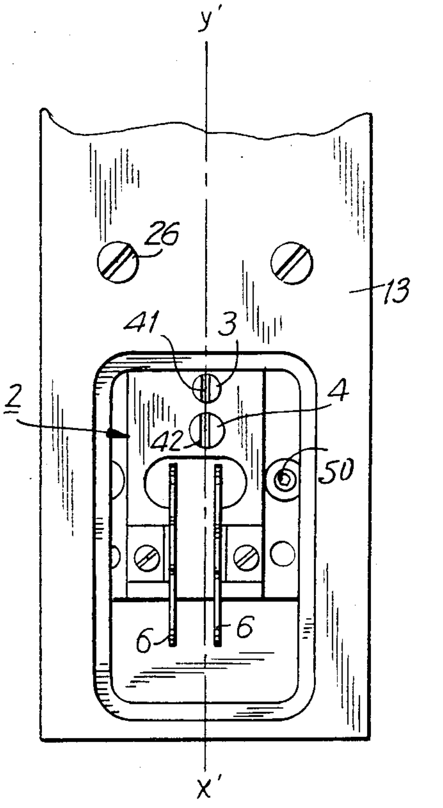

This structural arrangement of the printing head in accordance with the invention is particularly advantageous for the practical application of the ink-jet printing process as will hereinafter be explained in greater detail. Reference will also be made to FIGS. 2, 3 and 4 which complete FIG. 1 and are respectively two sectional views and a plan view of that portion of the printing head which has the primary function of controlling the quality of printing. The casing 8 which constitutes a first support for the essential elements hereinabove set forth is designated in the following description as a support casing 8. This support casing is made up of a vertical end-wall 13, a bottom wall 14, a top wall 15 and two side walls 16 and 17. The electrovalve system 5 is introduced within the support casing 8 and is attached to this latter by any means known per se. Technical means of standard types such as electrical connections, fluid supply piping, safety valves, and generally speaking all ancillary equipment which is not directly relevant to the invention, have been omitted from the drawings by reason of their conventional nature. Accordingly, the drawings show only the passageway 18 provided for these ancillary means in the top wall 15. The bottom wall 14 has an aperture 190 through which the calibrated ink drops are intended to pass, the drops being charged and deflected toward the substrate to be printed (not shown in the drawings). The dump-tube holder 7 and the tube 66 for dumping and recovery are attached to said bottom wall 14. The modulator element 1 is essentially constituted by a base 19 having a bore 20 which has a diameter D and into which is introduced the modulator body 21 proper. The modulator element can consist, for example, of a vibratory device comprising piezoelectric elements as described in French Pat. No. EN 7923934 filed by the present Applicant on Sept. 26th, 1979 and published under No 2,465,528. The modulator body 21 is adapted to carry a cylindrical plate 22 at its lower end, said plate being secured by means of at least three attachment points 25 relatively spaced at an angle $\alpha$, where $\alpha=120°$ if said points are three in number as in the example described (and as shown in FIG. 4). Said plate 22 is adapted to carry a nozzle 23 formed for example by a ruby pierced by an orifice 24 through which the jet or stream of ink drops is ejected along a path represented schematically by the axes X-Y and X'-Y'. As shown in FIG. 2, the base 19 of the modulator element 1 is rigidly fixed to the vertical end-wall 13 of the support casing 8 by any known means such as a screw 26, for example.

In accordance with one of the distinctive features of the invention, the faces 28 of the base 19 of the modulator body 21 are machined to very precise dimensional tolerances and are perfectly parallel. Furthermore, the vertical movement of translation and the movement of rotation of the modulator body 21 within the bore 20 are adjustable by sliding and/or rotating the body 21 within the base 19 and locking it in the desired position by means of a set screw 30. The base 19 which supports the modulator body 21 is also provided with a recess 31 in which is formed a bore 32 for accommodating a pin 34. When the modulator element 1 is fixed within the support casing 8 together with all the other ancillary components employed in the upper portion of the casing 8, the stationary upper section 10 of the cover 9 is placed in position. Said upper section 10 is also shaped so as to form a recess 35 which provides a clearance space for the ends of the pin 34. Said ends are in turn intended to be engaged within a bore 36 formed in the lower section 11 of the cover 9 as will be explained below.

A second extremely important element of the invention is the electrode-holder 2 which is adapted to cooperate with the modulator element 1 and thus performs a function which is essential to good operation of the printing head. Said electrode holder essentially comprises a support body 40, a charging electrode 3 and a charging-control electrode 4 which are inserted and fixed in the support body, and a set of deflecting plates 6 which are also fixed in said body. The two electrodes 3 and 4 are each provided with a calibrated slit 41 and 42 through which the stream of ink drops delivered by the modulator element 1 and the nozzle 23 flows before passing through the space located between the two deflecting plates 5 and 6. The slits 41 and 42 formed in these electrodes and the bearing faces of the deflecting plates are so designed and constructed as to be strictly parallel. In accordance with an important feature of the invention, the electrode-holder 2 is securely attached to the lower section 11 of the cover 9 which is intended to close the support casing 8 after this latter has been fitted with the modulator element 1. This attachment is carried out by making use of a means 50 for performing adjustment of transverse positioning of the electrode-holder 2 which can also be positioned in the vertical direction by a set of studs 51 while being prevented by these latter from sliding in the longitudinal direction. When the electrode-holder 2 is attached to the lower section 11 of the cover 9, said lower section is placed in position on the support casing 8 which has already been fitted with the upper section 10 of its cover 9. The pin 34 passes through the section 11 and the modulator base 19 passes through the bores 32 and 36. The lower cover section 11 is guided in position on the faces 28 of the base 19. When all the adjustments which remain to be described below have been completed and when the printing head is in readiness for operation, the lower section 11 of the cover 9 is stationarily fixed, for example by means of a knurled nut 60 which securely attaches said lower cover section to the bottom wall 14 of the support casing 8.

The structure of the elemental components described in the foregoing and the combination of these components permits all of the adjustments which are necessary for the good operation of a printing head in accordance with the invention.

In the first place, when a ruby is set in a support member as is the case with the nozzle 23 inserted in the cylindrical plate 22, and if the face of this support member is taken as a reference, it is very difficult to obtain a jet which is perfectly perpendicular to said face. The fact that the plate 22 can be set in at least three different angular orientations by means of at least three attachment points relatively spaced at an angular interval $\alpha$ corresponding to 120°, for example, makes it possible to choose the particular orientation which ensures that the jet is located in (or is very close to) a plane which passes along the axis X'-Y'. Furthermore, since the modulator body 21 can be oriented by rotational displacement within the modulator base 19, the combination of the two related actions of the nozzle-holder plate 22 and of the modulator body 21 invariably permits fulfilment of the basic condition which entails the need to direct the jet in a plane parallel to the faces of the charging electrodes 3 and 4 defined by the slits 41 and 42 and to the deflecting plates 6. In regard to the necessary parallel relation of said electrode faces and of said deflecting plates, this is achieved by accurate construction.

In the second place, when this parallel relation has been satisfied, centering of the jet is ensured by making use of a centering means 50.

By carrying out adjustments which are both simple and permanent, there is accordingly obtained optimum centering and orientation of the jet with respect to the functional elements with which it is associated.

In the third place, the charging electrode 3 is intended to be located at a predetermined distance from the precise point at which the jet is pinched and severed so as to form droplets. In actual practice, pinch-off must occur at the center of the slit 41 of the charging electrode 3. Since said electrode has a fixed position with respect to the modulator base 19, the fact that the modulator body 21 can be positioned vertically within the bore 20 makes it possible to satisfy this criterion.

The dump tube 66 is also attached to the bottom wall of the casing 8. The design function of the dump tube is to collect ink drops which have not been used for printing.

A printing head in accordance with the invention can be fitted on all printers of the so-called continuous ink-jet type. Aside from the ease of adjustments already mentioned in the foregoing, a further point worthy of note is the fact that maintenance is made particularly convenient by the possibility of opening the cover 9, the lower section 11 of which can be displaced in rotation about the pin 34. The substrate to be printed is placed opposite to the aperture 190 formed in the bottom wall 14 of the casing 8 and at right angles to the axis X-Y of the jet defined earlier.

What is claimed is:

1. An ink jet printing head comprising:

a casing having an end wall, top and bottom walls and opposite facing side walls;

a cover for said casing having a stationery upper section and a movable lower section;

a modulator element rigidly fixed to said casing for pinching off and severing a jet of ink, said modulator element having a base with a bore therethrough, a modulator body carried within said bore, and a modulator plate supported by said modulator body;

rotational adjusting means for adjusting the angular position of said modulator body within said base and translational adjusting means for adjusting the axial position of said modulator body within said base;

means carried by said modulator plate of said modulator element for ejecting a stream of calibrated ink drops;

an electrode holder element securely attached to said movable lower section of said cover, said electrode holder element having means for applying an electrostatic charge to said ink drops and means for electrostatically deflecting said ink drops when said cover is adsembled with said casing;

a dump and recovery tube attached to the bottom wall of said casing for collecting and recirculating unused ink drops; and an aperture in said lower wall of said casing through which said stream of calibrated ink drops flow toward a surface to be printed.

2. The ink jet printing head according to claim 1 wherein said modulator plate is secured to said modulator body by at least three attachment means whereby said rotational adjustment means and angular positioning of said plate maximize the perpendicularity of said stream of calibrated ink drops along an X-Y axis and so that the axial position of said modulator body is optimized for correct positioning of pinch-off and severing the ink jet.

3. The ink jet printing head according to claim 1 wherein opposite side faces of the modulator base are machined so as to conform to specified tolerances of parallel allignment.

4. The ink jet printing head according to claim 3 further comprising a recess formed in the modulator base, said recess forming a recessed surface and a raised surface, and a bore positioned in said recess through said recessed surface for receiving a pin arranged for attaching said movable lower section of said cover to said modulator element.

5. The ink jet printing head according to claim 4 further comprising fastening means for fixing said modulator element to said end wall of said casing, said stationery upper section of said cover being attached to said casing opposite said end wall, and a recess formed in said stationery upper section of said cover so that when said stationery upper section of said cover is assembled with said casing it will cover the raised surface formed in said modulator base by said recesses therein.

6. The ink jet printing head according to claim 1 wherein said electrode holder element comprises a support body, said means for applying an electrostatic charge to said ink drops comprising a charging electrode and a charging-control electrode mounted on said support body, said means for deflecting said ink drops comprising deflecting plates mounted on said support body, said control electrodes having slits formed therein through which said ink drops are arranged to pass, and the bearing faces of said deflecting plates being arranged parralel to each other.

7. The ink jet printing head according to claim 6 wherein said electrode holder element is rigidly fixed to said movable lower section of said cover in a manner so as to permit transverse adjustment of said slits for centering them with respect to the X-Y access of the stream of calibrated ink drops produced by said modulator element.

8. The ink jet printing head according to claim 7 further comprising studs arranged to ensure stationery positioning of said electrode holder elements in the longitudinal direction with respect to said stream of ink drops when said element is rigidly fixed to said movable lower section of said cover.

9. The ink jet printing head according to claim 4 further comprising a bore in said movable lower section of said cover for receiving said pin arranged for positioning with said modulator base for attaching said movable lower section of said cover to said modulator base.

10. The ink het printing head according to claim 9 further comprising a knurled nut for rigidly fixing the lower section of said cover to the bottom wall of said casing.

* * * * *